Sept. 26, 1950     H. G. FREEMAN ET AL     2,523,617
HANDLE CONSTRUCTION FOR BALL VALVES
Filed Oct. 15, 1946

*INVENTOR.*
HOWARD G. FREEMAN
ADAM T. KOSCIUSKO
BY *Jenney & Hildreth*
ATTORNEYS Patented Sept. 26, 1950

2,523,617

UNITED STATES PATENT OFFICE 2,523,617

HANDLE CONSTRUCTION FOR BALL VALVES

Howard G. Freeman, Worcester, and Adam T. Kosciusko, Auburn, Mass., assignors to Rockwood Sprinkler Company, Worcester, Mass., a corporation of Massachusetts Application October 15, 1946, Serial No. 703,374

3 Claims. (Cl. 251—100)

The present invention relates to a handle construction for ball valves.

Ball valves, as distinguished from gate and globe valves, do not inherently possess limit stops to define the open and closed positions of the valve. It is customary, therefore, to provide on the valve handle a lug that cooperates with abutments on the valve body to restrict the movement of the valve handle to an arc that corresponds to rotation of the valve ball between its fully-open and its fully-closed position.

There are numerous occasions where it is found that the quadrant through which the valve handle operates is not the most convenient one for the particular application or installation in which the valve is to be employed. To overcome this difficulty, the present invention has as an object the provision of a novel handle construction, especially although by no means exclusively suited to ball valves, that permits the quadrant through which the valve handle is to operate to be selected at the time of installation, or to be changed thereafter, while providing accurately determined limit stops for each quadrant.

According to a feature of the invention, there is provided a single valve handle having a plurality of lugs so positioned as to define, in cooperation with abutment means on the valve body, four quadrants of handle swing. The particular quadrant through which the handle is to swing is determined by the position in which the handle is secured to the valve shaft, whether in normal or in inverted position, and whether extending in one direction or turned 180° therefrom. The lugs are so arranged that whatever the position in which the handle is installed, accurate limit stops are provided to define the open and closed positions in that quadrant.

Figure 1:
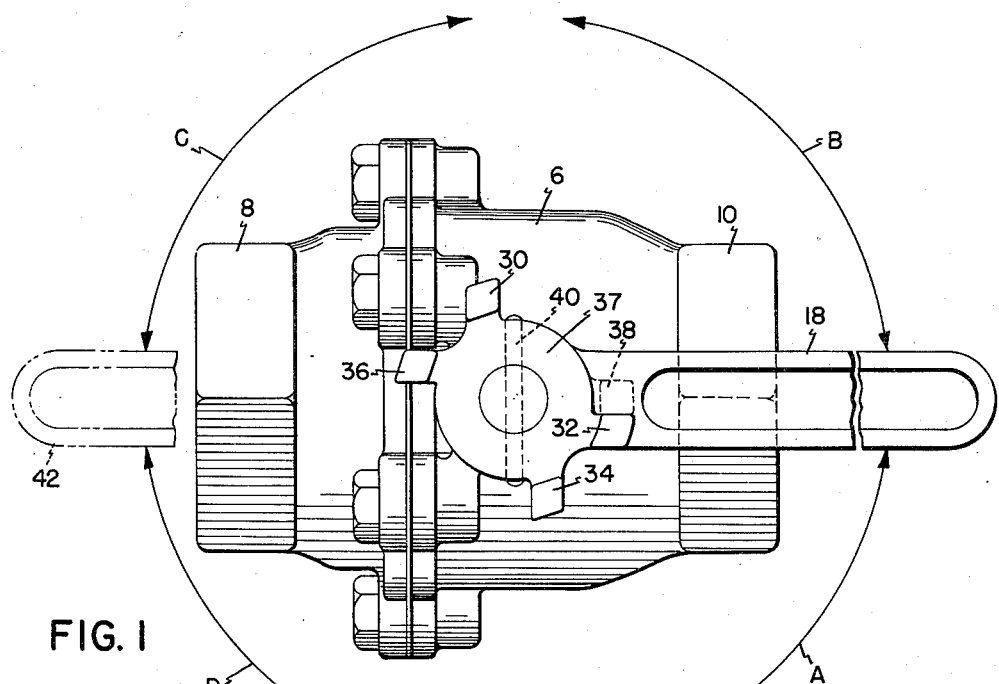
Figure 2:
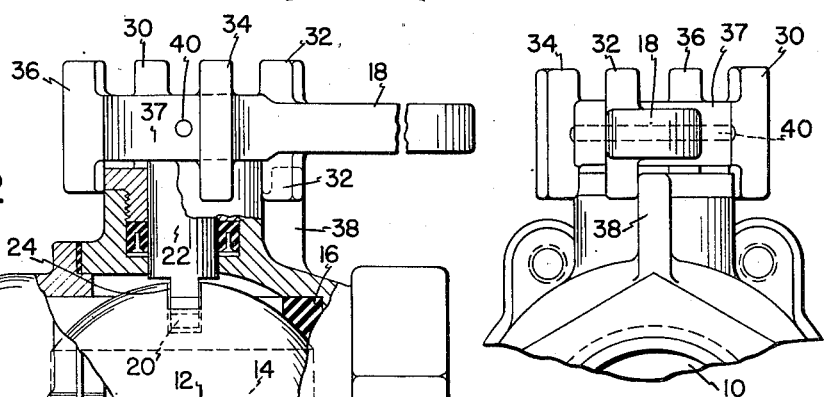
Figure 3:
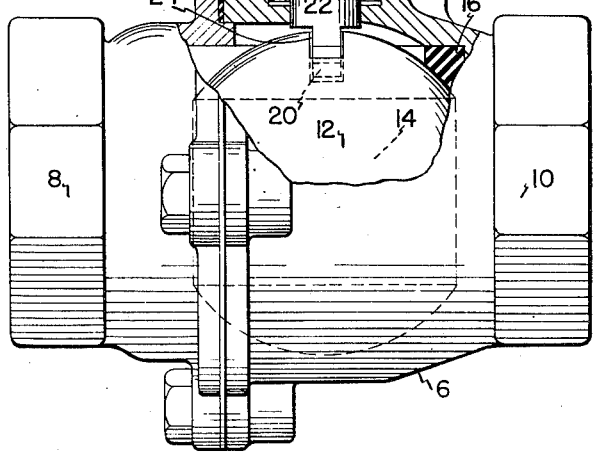

In the drawings illustrating the invention according to a preferred embodiment thereof, Fig. 1 is a top view of a valve showing the handle arranged for operation in the quadrant normally employed; Fig. 2 is a side view of the valve, partly broken away, and Fig. 3 is an end view showing the handle and adjacent portion of the valve.

The handle construction is illustrated as embodied in a valve of the general type shown in copending application Ser. No. 659,777 filed April 5, 1946 by Howard G. Freeman, one of the present inventors. The valve comprises a body 6 having an inlet 8 and an outlet 10. Control of fluid flow is provided by a valve ball 12 having a passage 14. A seat 16 of resilient material such as rubber provides sealing engagement with the valve ball, while permitting the ball to be turned freely by handle 18. Connection to the ball is made by the keyed or flattened end 20 of shaft 22, which is received within a milled slot 24 in the valve ball.

To define the open and closed positions of the valve for each of the quadrants in which the handle may be installed to operate, the handle is provided with a plurality of lugs, indicated at 30, 32, 34 and 36. These lugs are arranged around and may conveniently be formed integrally with the boss 37 at the shaft end of the handle. The lugs project beyond the boss on both sides thereof so as to provide engagement with the fixed abutment 38 on the valve body whether the handle be installed in normal or in inverted position.

The handle is secured to the shaft 22 by a type of attachment that permits the handle to be installed in any one of four positions. A drive pin 40 transverse to the valve passage, or else in line with the valve passage, provides a simple but effective mode of attachment that permits the handle position readily to be changed as conditions may require.

Fig. 1 shows the handle installed according to conventional practice, with the operation in quadrant A. That is, the handle is to the right, in line with the valve, for open position, and swings clockwise to close the valve. Lugs 30 and 32 provide the limit stops for the handle swing in this quadrant. It will be observed that while the angle between the acting faces on these lugs is 90°, the effective arc between the two faces exceeds 90° by the thickness of the fixed abutment 38, in order to provide the full 90° swing for the handle.

If the pin 40 is driven out and the handle removed and turned through 180° and the pin replaced, then the open position of the valve will be with the handle to the left, as indicated in broken outline at 42. To close the valve, the handle is swung in clockwise direction upwardly, through quadrant C. For this quadrant, lugs 34 and 36 control the closed and open positions, respectively, of the valve ball.

To provide for operation in quadrant B, the valve handle is inverted from its normal position, so that it still extends to the right, as viewed in Fig. 1, but turned top to bottom. In this quadrant, the opposite ends of lugs 30 and 32 define the open and closed positions of the valve, as compared with normal position for quadrant A operation.

The fourth position, in which the handle operates in quadrant D, is provided by installing the handle to the left and inverted. Lugs 34 and 36 provide the limit stops, but making use of their opposite ends as a result of the inverted position, as compared with operation in the other left hand quadrant C.

While the invention has been illustrated and described as involving the use of two pairs of lugs on the handle and a single abutment on the valve body, it will be appreciated that it is equally effective to employ two abutments, diametrically opposed, on the valve body, in conjunction with a single pair of lugs on the valve handle, said lugs to be operative whether the handle be installed in normal or in inverted position.

It is apparent that in each of the above described arrangements of lugs and abutment means, one pair of lugs will always be in position to cooperate with adjacent abutment means to limit the handle swing to the proper amount for each quadrant in which the handle may be required to operate. The invention thus makes possible, in a simple construction requiring no extra or substitute parts, the positive and accurate positioning of the valve in open and closed positions while permitting a choice as to the particular quadrant in which the handle is to swing.

We claim:

1. A handle for a valve having a valve-rotating shaft and an abutment on the valve body, said handle having a boss having upper and lower faces and means for connecting the boss to the shaft with either the lower or the upper face of the boss adjacent the valve body, said boss having a pair of lugs each exposed both above and below the valve handle and adapted to extend into cooperating relation with the abutment to limit handle rotation to one quadrant when the boss is connected to the shaft with one face of the boss adjacent the valve body, and to limit handle rotation to another quadrant when the boss is connected to the shaft with the other face adjacent the valve body.

2. A handle for a valve having a valve-rotating shaft and a fixed abutment on the valve body, said handle having a boss having axially-spaced faces and means for connecting the boss to the shaft in normal and in inverted positions with one or the other faces of the boss adjacent the valve body, said boss having a pair of lugs each exposed axially beyond the volve handle on both sides thereof and adapted to extend into cooperating relation with the abutment to limit handle rotation to one quadrant when the boss of the handle is connected to the shaft with one face of the boss adjacent the valve body, and to limit handle rotation to another quadrant when the boss is connected to the shaft with the other face of the boss adjacent the valve body.

3. A handle for a valve having a valve-rotating shaft and a fixed abutment on the valve body, said handle having a boss having axially-spaced faces and means for connecting the boss to the shaft in normal and in inverted positions with one or the other faces of the boss adjacent the valve body, said boss having a pair of lugs each projecting from the boss beyond both faces thereof and adapted to extend into cooperating relation with the abutment to limit handle rotation to one quadrant when the boss of the handle is connected to the shaft with one face of the boss adjacent the valve body, and to limit handle rotation to another quadrant when the boss is connected to the shaft with the other face of the boss adjacent the valve body.

HOWARD G. FREEMAN.
ADAM T. KOSCIUSKO.

REFERENCES CITED

The following references are of record in the file of this patent:

UNITED STATES PATENTS

| Number | Name | Date |
| --- | --- | --- |
| 1,183,012 | Kunzer | May 16, 1916 |
| 1,505,729 | Robertshaw | Aug. 19, 1929 |
| 1,724,686 | Snebold | Aug. 13, 1929 |